US011228998B1

(12) United States Patent
Gupta et al.

(10) Patent No.: US 11,228,998 B1
(45) Date of Patent: Jan. 18, 2022

(54) COMMUNICATION DEVICE HAVING DYNAMIC MULTIPLE CARRIER SELECTION

(71) Applicant: MOTOROLA MOBILITY LLC, Chicago, IL (US)

(72) Inventors: Ranjeet Gupta, Naperville, IL (US); Daniel C. Chisu, Franklin Park, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/112,872

(22) Filed: Dec. 4, 2020

(51) Int. Cl.
*H04W 60/00* (2009.01)
*H04W 8/18* (2009.01)
*H04W 84/04* (2009.01)

(52) U.S. Cl.
CPC ........... *H04W 60/005* (2013.01); *H04W 8/18* (2013.01); *H04W 84/042* (2013.01)

(58) Field of Classification Search
CPC .... H04W 60/005; H04W 8/18; H04W 84/042
See application file for complete search history.

(56) References Cited

U.S. PATENT DOCUMENTS

| 9,661,674 | B2 | 5/2017 | Su | |
|---|---|---|---|---|
| 2017/0280379 | A1* | 9/2017 | Axmon | H04W 16/18 |
| 2018/0041953 | A1* | 2/2018 | Lindoff | H04W 24/08 |
| 2019/0159116 | A1* | 5/2019 | Guan | H04W 60/00 |

\* cited by examiner

*Primary Examiner* — Marisol Figueroa
(74) *Attorney, Agent, or Firm* — Isidore PLLC

(57) ABSTRACT

A communication device, method and computer program product enable increased functionality using multiple subscriber identity modules (SIMs). The communication device is camped on a first network node of a first subset of network nodes of a first public land mobile network (PLMN) as one home PLMN using a first SIM. The communication device is camped on a second network node of a second subset of network nodes of a second PLMN as another home PLMN using a second SIM. The communication device monitors communication performance and level of quality of service available from the second PLMN while connected using the second SIM. In response to determining that the communication performance and/or the level of quality of service would be improved, the communication device triggers a radio frequency (RF) front end of the communication device to scan for, acquire, and register to one of the first subset of network nodes using the second SIM.

20 Claims, 7 Drawing Sheets

US 11,228,998 B1

COMMUNICATION DEVICE HAVING DYNAMIC MULTIPLE CARRIER SELECTION

1. TECHNICAL FIELD

The present disclosure relates generally to communication devices that subscribe to carrier cellular services, and more particularly to communication devices that are provisioned to connect to two or more subscribed carrier services simultaneously.

2. DESCRIPTION OF THE RELATED ART

A subscriber identity module (SIM), widely known as a "SIM card", is an integrated circuit that is intended to securely store an international mobile subscriber identity (IMSI) number and a related key, which are used to identify and authenticate subscribers on mobile telephony devices (such as mobile phones and computers). An embedded-SIM (eSIM) or embedded universal integrated circuit card (eUICC) is a form of programmable SIM card that is embedded directly into a device. Dual SIM communication devices allow a user to have a single mobile communication device with two different IMSIs, each SIM independently supporting voice and/or data communication via a respective wireless network operator. Carriers that provide access to different public land mobile networks (PLMNs) via the respective SIM can enable in-network service via one or more radio access technologies (RATs) in a particular location, as well as allowing roaming services via one or more RATs on a network of another carrier.

Conventional communication devices have a static approach to using dual SIM capabilities. For example, a first SIM can be camped on a cell of a first PLMN using a RAT such as fifth generation (5G). A second SIM can be camped on another cell of a corresponding second PLMN using a lower bandwidth or a higher latency RAT such as fourth generation (4G). Unless moved out of the respective coverage areas, the conventional communication device will persist in this arrangement regardless of changes in communication requirements by applications being executed on the communication device.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
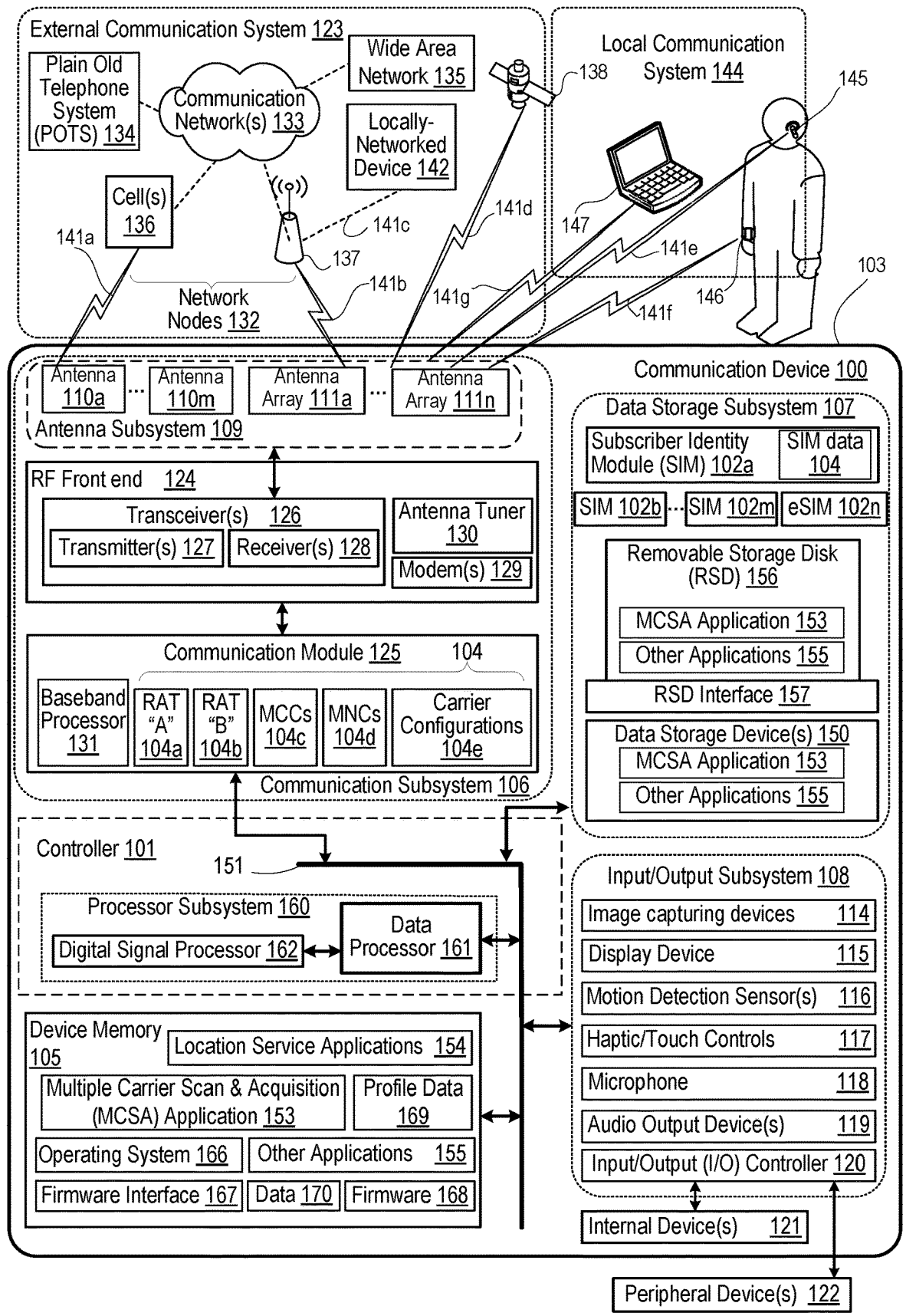
FIG. 1 depicts a functional block diagram of a communication device that operates in a communication environment and within which the features of the present disclosure are advantageously implemented, according to one or more embodiments.

According to aspects of the present disclosure, a communication device, a computer program product, and a method provide increased functionality of a radio frequency (RF) front end of the communication device configured with multiple subscriber identity modules (SIMs). The SIMS can be implemented as replaceable/insertable or embedded electronic components. The SIMS can be implemented consistent with standards such as universal integrated circuit card (UICC) standard. The RF front end is configurable for over-the-air (OTA) communication for cellular and/or wireless service. A first SIM enables the RF front end to communicate with a first public land mobile network (PLMN) as a first home PLMN via one of a first subset of network nodes operated by at least one first carrier. At least one second SIM enables the RF front end to communicate via a second PLMN as a second home PLMN via one of a second subset of network nodes operated by at least one second carrier. A memory of the communication device stores a multiple carrier scan and acquisition (MCSA) application and one or more applications that use communication services provided by the RF front end. A controller of the communication device is communicatively coupled to the RF front end, the first SIM, each of the at least one second SIM, and the memory. The controller executes the MCSA application to configure the communication device to provide multi-SIM operational functionality. The multi-SIM operational functionality includes determining that the RF front end is camped on a first network node of the first subset of network nodes using the first SIM and on a second network node of the second subset of network nodes using a second SIM among the at least one second SIM. Being camped on either the first or the second network node can include having an active connection to/with the respective network. The multi-SIM operational functionality includes monitoring at least one of (i) communication performance by the network node of the PLMN and (ii) level of quality of service available from the second PLMN while the communication device is connected using the second SIM. The communication performance can be related to the technical capabilities of the closest network node of the second PLMN at current location of the communication device. The level of quality of service can be related to a contracted level of communication service from the carrier of the second PLMN. The contracted level of quality of service is associated with the second SIM. The carrier can offer tiers of communication service with certain subscribers paying more for a higher level of quality of service. The multi-SIM operational functionality includes evaluating whether at least one of the communication performance and the level of quality of service is improved by connecting via the second SIM to the first PLMN. In response to determining that at least one of the communication performance and the level of quality of service would be improved by connecting via the second SIM to the first PLMN, the controller triggers the RF front end to scan for and acquire one of the first subset of network nodes using the second SIM and register the communication device on the first PLMN using the second SIM.

The present disclosure describes communication devices that are enabled by SIM profiles stored on SIMs to access a PLMN using cellular radio access technology. For clarity, terms associated with cellular OTA such as "roaming" and "home PLMN" are used herein. In one or more embodiments, the PLMN is operated by a single carrier and includes OTA access using only cellular services. In one or more embodiments, the PLMN is operated by a single carrier and includes OTA access using both cellular and wireless services. As presented herein, the present disclosure refers to cellular services as associated with a number of standards organizations under the umbrella of the 3rd Generation Partnership Project (3GPP) which develop protocols for mobile telecommunications. Cellular services include other similar protocols for mobile telecommunications. The present disclosure also refers to wireless services as associated with wireless access networks that are compliant with IEEE 802.11 standards and similar over-the-air Internet technologies. "Wi-Fi" is one particular compliance brand of wireless services by the Wi-Fi Alliance. In one or more embodiments, the PLMN is operated by a single carrier and includes OTA access using wireless services. In one or more embodiments, the PLMN is operated by a mobile virtual network operator (MVNO) and includes OTA access using cellular and wireless services. An MVNO is a wireless communications services provider that does not own the wireless network infrastructure over which the provider provides services to its customers. An MVNO enters into a business agreement with a mobile network operator to obtain bulk access to network services at wholesale rates, then sets retail prices independently. An MVNO may use its own customer service, billing support systems, marketing, and sales personnel, or it could employ the services of a mobile virtual network enabler (MVNE). The home PLMN for the MVNO can encompass communication networks operated by multiple carriers and can include one or more wireless access networks. The SIM contains SIM data such as a SIM profile having subscription credentials that identifies the communication device as subscriber for connecting to the PLMN as the home PLMN. For other PLMNs, agreements can exist between carriers or MVNOs that allow roaming access. For example, the MVNO/carrier of the home PLMN can handle billing of an additional usage charge to the customer for the communication device being connected to the other PLMN. The SIM profile configures the communication device to connect, as a visitor or guest, to other PLMNs that are not the home PLMN.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, which is managed by controller 101, in an operating environment within which the features of the present disclosure are advantageously implemented. According to one aspect, communication device 100 includes multiple subscriber identity modules (SIMS) 102*a*-102*n*. In one or more embodiments, SIMS 102*a*-102*n* are physical integrated circuit board devices that are replaceable through housing 103 of communication device 100. SIMS 102*a*-102*n* contain SIM data 104, such as a subscriber profile, which configure communication device 100 for over-the-air (OTA) communication. SIMS 102*a*-102*n* are integrated circuits that are intended to securely store the international mobile subscriber identity (IMSI) number and a related key. The IMSI number and related key are used to identify and authenticate subscribers on mobile telephony devices such as mobile phones and computers. In one or more embodiments, SIMS 102a-102m are replaceable smart cards. In one or more embodiments, communication device 100 includes one or more embedded SIMS (eSIMs) 102n that can be updated with SIM data 104, which configure communication device 100 for OTA communication. The term "subscriber identity module (SIM)" is used herein to broadly encompass the various types of replaceable and embedded modules. Communication device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring again to the specific component makeup and the associated functionality of communication device 100. In one or more embodiments, communication device 100 includes device memory 105, communication subsystem 106, data storage subsystem 107, and input/output (I/O) subsystem 108. Device memory 105 and each subsystem (106, 107, and 108) are managed by controller 101. Device memory 105 includes program code and applications such as MCSA application 153, location service applications 154, and other application(s) 155 that use communication services. Device memory 105 further includes operating system (OS) 166, firmware interface 167, such as basic input/output system (BIOS) or Uniform Extensible Firmware Interface (UEFI), and firmware 168. Device memory 105 includes profile data 169 or other computer data 170 used by MCSA application 153.

Processor subsystem 160 of controller 101 executes program code to provide operating functionality of communication device 100. The software and/or firmware modules have varying functionality when their corresponding program code is executed by processor subsystem 160 or secondary processing devices within communication device 100. Processor subsystem 160 of controller 101 can execute program code of MCSA application 154 to improve communication performance and/or level of quality of service. MCSA application 153 configures RF front end 124 to scan and acquire network nodes 132 using SIMs 102a-102n.

I/O subsystem 108 includes image capturing device(s) 114. I/O subsystem 108 includes user interface devices such as display device 115, motion detection sensors 116, touch/haptic controls 117, microphone 118, and audio output device(s) 119. I/O subsystem 108 also includes I/O controller 120. In one or more embodiments, motion detection sensors 116 can detect an orientation and movement of the communication device 100 that indicates that the communication device 100 should activate display device 118 or should vertically reorient visual content presented on display device 118. In one or more embodiments, motion detection sensors 116 are used for functions other than user inputs, such as detecting an impending ground impact. I/O controller 120 connects to internal devices 121, which are internal to housing 103 and to peripheral devices 122, such as external speakers, which are external to housing 103 of communication device 100. Examples of internal devices 121 are computing, storage, communication, or sensing components depicted within housing 103. I/O controller 120 supports the necessary configuration of connectors, electrical power, communication protocols, and data buffering to act as an interface to internal devices 121 and peripheral devices 122 to other components of communication device 100 that use a different configuration for inputs and outputs.

Communication subsystem 106 of communication device 100 enables wireless communication with external communication system 123. Communication subsystem 106 includes antenna subsystem 109 having lower band antennas 110a-110m and higher band antenna arrays 111a-111n that can be attached in/at different portions of housing 103. Communication subsystem 106 includes radio frequency (RF) front end 124 and communication module 125. RF front end 124 includes transceiver(s) 126, which includes transmitter(s) 127 and receiver(s) 128. RF front end 124 further includes modem(s) 129. RF front end 124 includes antenna tuner 130. Communication module 125 of communication subsystem 106 includes baseband processor 131 and is configured with SIM data 104 from at least one of SIMs 102a-102b. Examples of SIM data 104 include RAT "A" data 104a, RAT "B" data 104b, mobile country codes (MCCs) 104c, mobile network codes (MNCs) 104d, and carrier configurations 104e. Baseband processor 131 communicates with controller 101 and RF front end 124. Baseband processor 131 operates in baseband frequency range to encode data for transmission and decode received data, according to a communication protocol. Modem(s) 129 modulate baseband encoded data from communication module 125 onto a carrier signal to provide a transmit signal that is amplified by transmitter(s) 127. Modem(s) 129 demodulates each signal received from external communication system 123 detected by antenna subsystem 109. The received signal is amplified and filtered by receiver(s) 128, which demodulate received encoded data from a received carrier signal. Antenna tuner 130 is connected to particular lower band antennas 110a-110m to tune impedance respectively of lower band antennas 110a-110m to match impedance of transceivers 126. Antenna tuner 130 can also be used to detune the impedance of lower band antennas 110a-110m to not match the impedance of transceivers 126.

In one or more embodiments, controller 101, via communication subsystem 106, performs multiple types of over-the-air (OTA) communication with network nodes 132 of external communication system 123. Particular network nodes 132 can be part of communication networks 133 of public land mobile networks (PLMNs) that provide connections to plain old telephone systems (POTS) 134 for voice calls and wide area networks (WANs) 135 for data sessions. WANs 135 can include Internet and other data networks. The particular network nodes 132 can be cells 136 such as provided by base stations or base nodes that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs.

In one or more embodiments, network nodes 132 can be access node(s) 137 that support wireless OTA communication. Communication subsystem 106 can receive OTA communication from location services such as provided by global positioning system (GPS) satellites 138. Communication subsystem 106 communicates via OTA communication channel(s) 141a with cells 136. Communication subsystem 106 communicates via wireless communication channel(s) 141b with access node 137. In one or more particular embodiments, access node 137 supports communication using one or more IEEE 802.11 wireless local area network (WLAN) protocols. In one or more particular embodiments, communication subsystem 106 communicates with one or more locally networked devices 142 via wired or wireless link 141c provided by access node 137. Communication subsystem 106 receives downlink broadcast channel(s) 141d from GPS satellites 138 to obtain geospatial location information.

In one or more embodiments, controller 101, via communication subsystem 106, performs multiple types of OTA communication with local communication system 144. In one or more embodiments, local communication system 144 includes wireless headset 145 and smart watch 146 that are coupled to communication device 100 to form a personal access network (PAN). Communication subsystem 106 communicates via low power wireless communication channel(s) 141e with headset 145. Communication subsystem 106 communicates via second low power wireless communication channel(s) 141f, such as Bluetooth, with smart watch 146. In one or more particular embodiments, communication subsystem 106 communicates with other communication device(s) 147 via wireless link 141g to form an ad hoc network.

Data storage subsystem 107 of communication device 100 includes data storage device(s) 150. Controller 101 is communicatively connected, via system interlink 151, to data storage device(s) 150. Data storage subsystem 107 provides applications, program code, and stored data on nonvolatile storage that is accessible by controller 101. For example, data storage subsystem 107 can provide a selection of program code and applications such as multiple carrier scan and acquisition (MCSA) application 153, location service applications 154, and other application(s) 155 that use communication services. These applications can be loaded into device memory 105 for execution by controller 101. In one or more embodiments, data storage device(s) 150 can include hard disk drives (HDDs), optical disk drives, and/or solid-state drives (SSDs), etc. Data storage subsystem 107 of communication device 100 can include removable storage device(s) (RSD(s)) 156, which is received in RSD interface 157. Controller 101 is communicatively connected to RSD 156, via system interlink 151 and RSD interface 157. In one or more embodiments, RSD 156 is a non-transitory computer program product or computer readable storage device. Controller 101 can access RSD 156 or data storage device(s) 150 to provision communication device 100 with program code, such as MCSA application 153 and other applications 155. When executed by controller 101, the program code causes or configures communication device 100 to provide the multi-SIM operational functionality described herein.

Controller 101 includes processor subsystem 160, which includes one or more central processing units (CPUs), depicted as data processor 161. Processor subsystem 160 can include one or more digital signal processors 162 that are integrated with data processor 161 or are communicatively coupled to data processor 161, such as baseband processor 131 of communication module 125. In one or embodiments that are not depicted, controller 101 can further include distributed processing and control components that are peripheral or remote to housing 103 or grouped with other components, such as I/O subsystem 108. Data processor 161 is communicatively coupled, via system interlink 151, to device memory 105. In one or more embodiments, controller 101 of communication device 100 is communicatively coupled via system interlink 151 to communication subsystem 106, data storage subsystem 107, and input/output subsystem 108. System interlink 151 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 151) are illustrated in FIG. 1, it is to be understood that more, fewer, or different interconnections may be present in other embodiments.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. For example, communication device 100 may use special purpose hardware, dedicated processors, general purpose computers, microprocessor-based computers, micro-controllers, optical computers, analog computers, dedicated processors and/or dedicated hard-wired logic.

Figure 2:
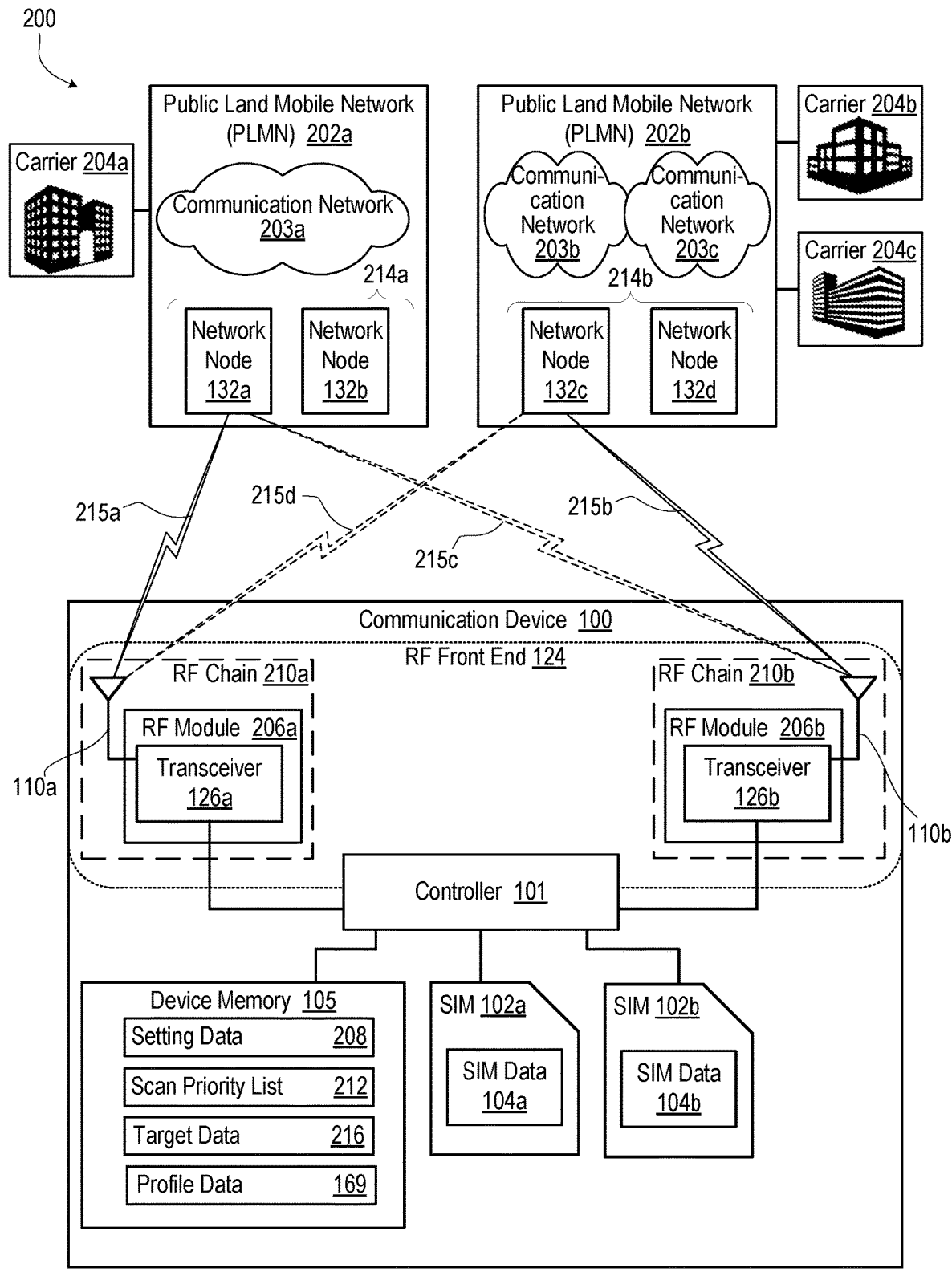
FIG. 2 depicts a simplified functional block diagram of the communication device that is provisioned with two subscriber identity modules (SIMS) to operate within a communication system having two communication networks, according to one or more embodiments.

FIG. 2 is a simplified functional block diagram of communication device 100 that is provisioned with first and second SIMs 102a-102b to operate within communication system 200, which is a stable, dual coverage area. The present disclosure provides methods/mechanisms for managing use of first and second SIMs 102a-102b in such a stable dual coverage area. For clarity, two SIMs 102a-102b are used; however, communication device 100 can include three or more SIMS. Communication device 100 is part of communication system 200 that, for clarity, includes first and second PLMNs 202a-202b. First PLMN 202a includes communication network(s) 203a. Carrier 204a, which operates communication network(s) 203a of PLMN 202a, provides SIM data 104 that is stored on SIM 102a. Second PLMN 202b includes communication network(s) 203b-203c. Carriers 204b-204c, which respectively operate communication networks 203b-203c of PLMN 202b, provide SIM data 104b that is stored on SIM 102b. Controller 101 configures RF modules 206a-206b of communication device 100 with SIM data 104a-104b of SIMS 102a-102b respectively to use subscriber services via OTA communications with respective PLMNs 202a-202b. Controller 101 can use SIM 102a to configure RF module 206a to connect to second subset 214b of network nodes 132c-132d of PLMN 202b as a non-subscriber. When a non-subscriber device is allowed to use a PLMN, the non-subscriber device is considered to be "roaming". Controller 101 can use SIM 102b to configure RF module 206b of communication device 100 to connect to first subset 214a of network nodes 132a-132b of PLMN 202a as a non-subscriber. For example, carriers 204a-204c can negotiate roaming or sharing agreements that allow subscribers to different PLMNs 202a-202b to use another one of PLMNs 202a-202b. Communication device 100 can include settings 208 in device memory 105 that enable or disable use of a particular SIM 102a-102b for another PLMNs 202a-202b. Disabling use on another PLMN 202a-202b can avoid an additional charge (i.e., roaming charges) for OTA communication on one of PLMN 202a-202b that the SIM is not subscribed to as a first home network. Transceiver 126a of RF module 206a can be connected to one or more antennas 110a to create RF chain 210a that can scan for, acquire, register on, and connect to one of PLMNs 202a-202b. Transceiver 126b of RF module 206b can be connected to one or more antennas 110b to create RF chain 210b that can scan for, acquire, register on, and connect to one of PLMNs 202a-202b. Periodically, controller 101 triggers one or more RF modules 206a-206b to scan for network nodes 132a-132d to update scan priority list 212 in device memory 105.

In one or more embodiments, controller 101 determines that transceiver 126a of RF module 206a of RF front end 124 is camped on first network node 132a of first subset 214a of network nodes 132a-132b using first SIM 102a. Controller 101 determines that transceiver 126b of RF module 206b of RF front end 124 is camped on third network node 132c of second subset 214b of network nodes 132c-132d using second SIM 102b. Controller 101 monitors at least one of (i) communication performance between network node 132c of second PLMN 202b and communication device 100; and (ii) level of quality of service available from second PLMN 202b while connected using second SIM 102b. The communication performance can have one or more factors including distance to a network node having the highest quality signal, presence of interference signals in bandwidth used by the network node, and transmitter and receiver capabilities of the network node and communication device 100. The level of quality of service can be a factor of types of data services offered and level of data throughput allocated to a particular type of subscription that second SIM 102b entitles communication device 100 to use. Controller 101 evaluates whether at least one of the communication performance and the level of quality of service would be improved by connecting via second SIM 102b to first PLMN 202a. In response to determining that at least one of the communication performance and the level of quality of service would be improved by connecting via second SIM 102b to first PLMN 202a, controller 101 triggers RF front end 124 to drop communication channel 215b and to scan for and acquire one of network nodes 132a-132b of first subset 214a using second SIM 102b. RF front end 124 registers communication device 100 on first PLMN 202a using second SIM 102b via third communication channel 215c.

In one or more embodiments, controller 101 determines that transceiver 126a of RF module 206a of RF front end 124 is camped on first network node 132a of first subset 214a of network nodes 132a-132b via first communication channel(s) 215a using first SIM 102a. Controller 101 determines that transceiver 126b of RF module 206b of RF front end 124 is camped on third network node 132c of second subset 214b via second communication channel(s) 215b using second SIM 102b. Controller 101 monitors at least one of (i) communication performance between network node 132a of first PLMN 202a and communication device 100 and (ii) level of quality of service available from first PLMN 202a while connected using first SIM 102a. Controller 101 evaluates whether at least one of the communication performance and the level of quality of service would be improved by connecting via first SIM 102a to second PLMN 202b. In response to determining that at least one of the communication performance and the level of quality of service would be improved by connecting via first SIM 102a to second PLMN 202b, controller 101 triggers RF front end 124 to drop first communication channel 215a and to scan for and acquire one of network nodes 132c-132d of second subset 214b using first SIM 102a. RF front end 124 registers communication device 100 on second PLMN 202b using first SIM 102a via fourth communication channel 215d.

In one or more embodiments, controller 101 receives a notification from an application executing on communication device 100 that communication performance is insufficient for performing a particular task. Controller 101 identifies one of RF chain 110a-110b respectively using SIMS 102a-102b that is camped on respective network node 132a, 132c that is limited by using a particular RAT. Controller 101 then determines that the communication performance would be improved by changing the one of RF chain 110a-110b to camp on another network node (132a-132d) of the other PLMN (202a-202b) that utilizes another RAT to enable/support the communication.

Controller 101 can reference target data 216 that includes communication performance thresholds or ranges that should be maintained. The data structure can be specific to particular applications so that communication is based on applications currently being executed. In one or more embodiments, controller 101 determines level of quality of service that are provided by a particular network node to an acceptable range defined in the target data 216. For example, the controller 101 can determine what level of quality of service are supported by a particular network node based on what types of RAT(s) are available. As another example, controller 101 can determine what level of quality of service is available from a particular network node based on how much allocation of uplink or downlink data transfer is available to communication device 100 based on second SIM 102b. Examples of levels of quality of service (QoS) include QoS Class Identifier (QCI) defined for 4G LTE uses a concept of and 5G QoS Identifier (5QI) used by 5G NR. Examples of levels of QoS can include different forms of communication, such voice, streaming audio, or video. Levels of QoS can relate to throttling of data throughput rates as compared to best effort.

In one or more embodiments, controller 101 determines one or more factors of the communication performance or level of quality of service that are available are unacceptable to applications being executed on the communication device. In one or more embodiments, controller 101 applies a weighting function to one or more key performance indicators (KPIs) that measure communication performance and level of quality of service to provide a weighted recommendation for whether to access a particular PLMN or communication network using a particular SIM. For example, communication device 100 can be closer to a network node that supports an older generation RAT and be farther from another network node that supports a later generation RAT. Certain KPIs can be better on the former network node whereas other KPIs can be better on the latter network node. The controller can determine whether to remain camped on the former network node or to switch to the latter network node based on determining whether any particular KPIs indicate a requirement to switch. For example, a KPI can be below a threshold for a successful connection. Absent identifying a KPI that requires the switch, the controller can determine whether to remain camped on the former network node or to switch to the latter network node based on determining whether a weighted combination of KPIs indicate a requirement to switch. Controller 101 can predict KPIs for the latter network node based on measurements, historical data on prior uses of the latter network node, associated performance based on an identified type of network node, reported information from the latter network node, or other information. For example, controller 101 can maintain and reference profile data 169 that captures the quality of service and communication performance of particular network nodes and geolocation derived from wide area network (WAN) network nodes when using a particular SIM.

Figure 3:
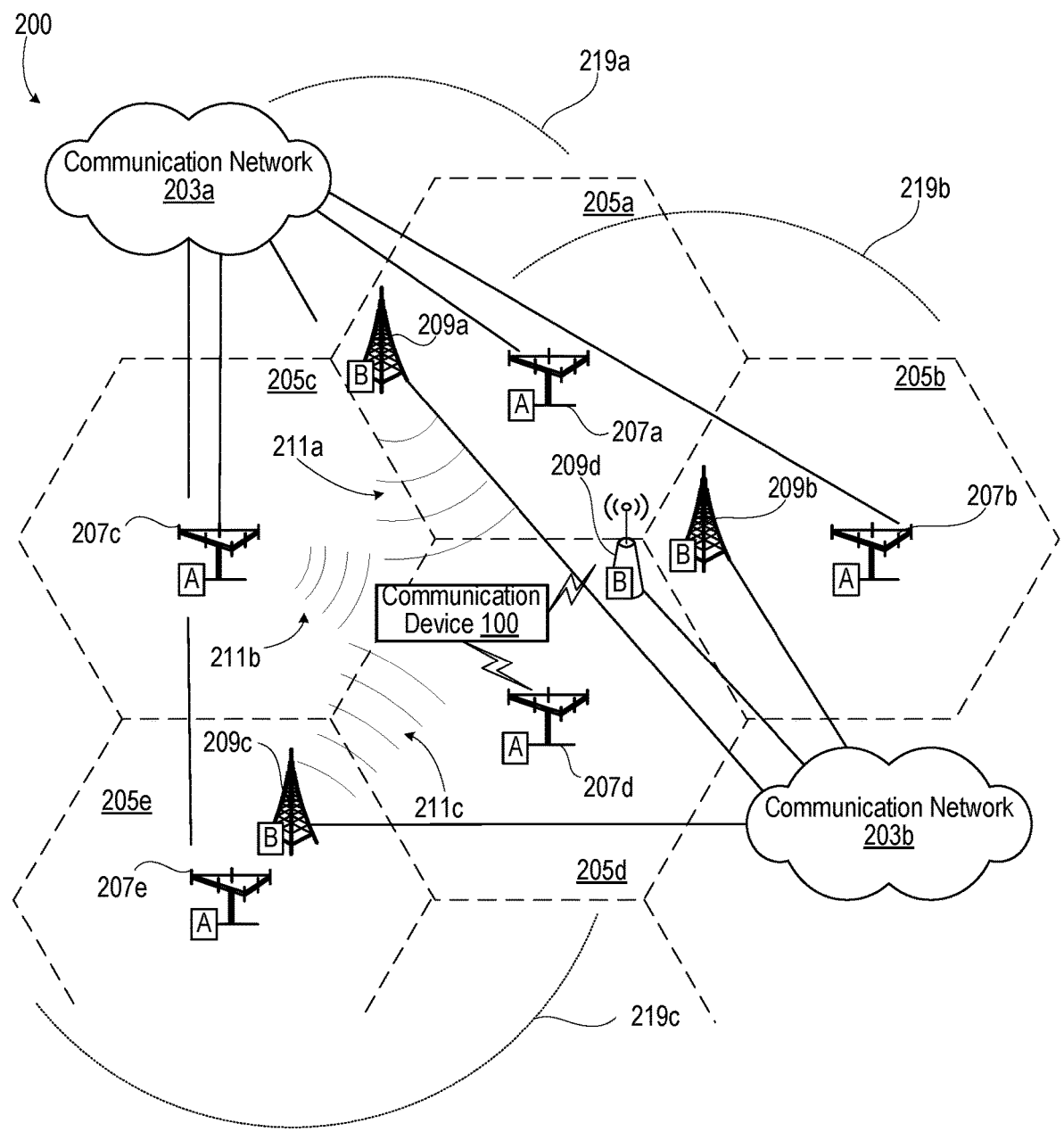
FIG. 3 depicts a diagram of a communication system that includes the communication device camping on two communication networks, according to one or more embodiments.

FIG. 3 depicts a diagram of communication system 200 that includes communication device 100 camping on communication networks 203a-203b. First communication network 203a provides cells 205a-205e serviced respectively by network nodes 207a-207e. Second communication network 203b provides OTA coverage areas 219a-219c of network nodes 209a-209d. Network nodes 209a-209c provide cellular communication service and network node 209d provides wireless communication service. Communication device 100 is camped on network node 207d of first communication network 203a and on network node 209d of second communication network 203b. Periodically, communication device 100 measures signal strength and other parameters of identification downlink channels 211a-211c respectively of neighboring network nodes 209a, 207c, 209c in preparation of movement of communication device 100 into a neighboring coverage area.

According to one aspect of the disclosure, communication device 100 is a multiple SIM mobile device that can dynamically switch a particular SIM of one carrier to a network of another carrier if that other network can offer a better user experience. In one or more embodiments, one network can provide a 5G RAT and another network can provide a 4G RAT. One or more KPIs can be monitored and used to trigger the dynamic switch, in one or more embodiments. Examples of KPIs include, but are not limited to including, a higher generation of RAT availability, better quality of service (QoS), better signal quality, reduced jitter, and reduced data latency. These KPIs can be based on a downlink, an uplink, or both downlink and uplink. In one or more embodiments, the dynamic switching occurs in response to detecting that communication device 100 is substantially stationary. The size of the coverage area is relatively large as compared to a rate of movement of communication device 100. In addition, communication device 100 is not in a marginal coverage area where one or both of uplink and downlink signal strength are marginal for maintaining a communication channel. Thus, communication device 100 is substantially stationary in that the likelihood of needing to be handed off to another network node is unlikely during a predefined period of time. In one or more embodiments, the dynamic switching occurs in response to detecting that the communication device 100 is not stationary, but that predictive, historical, or learned KPI values indicate that communication device 100 will be in a stable, dual coverage area for a predetermined amount of time. In one or more embodiments, communication device 100 intelligently triggers switching based on QoS requirements for particular applications that are being actively executing on communication device 100. For example, an active application can require a higher data rate or a lower data latency that can be satisfied by switching to another communication network 203a-203b. Communication device 100 can also determine that switching can achieve a lower power consumption level or a lower subscription cost when communication requirements can also be met by a lower performing communication network 203a-203b.

Figure 4A:
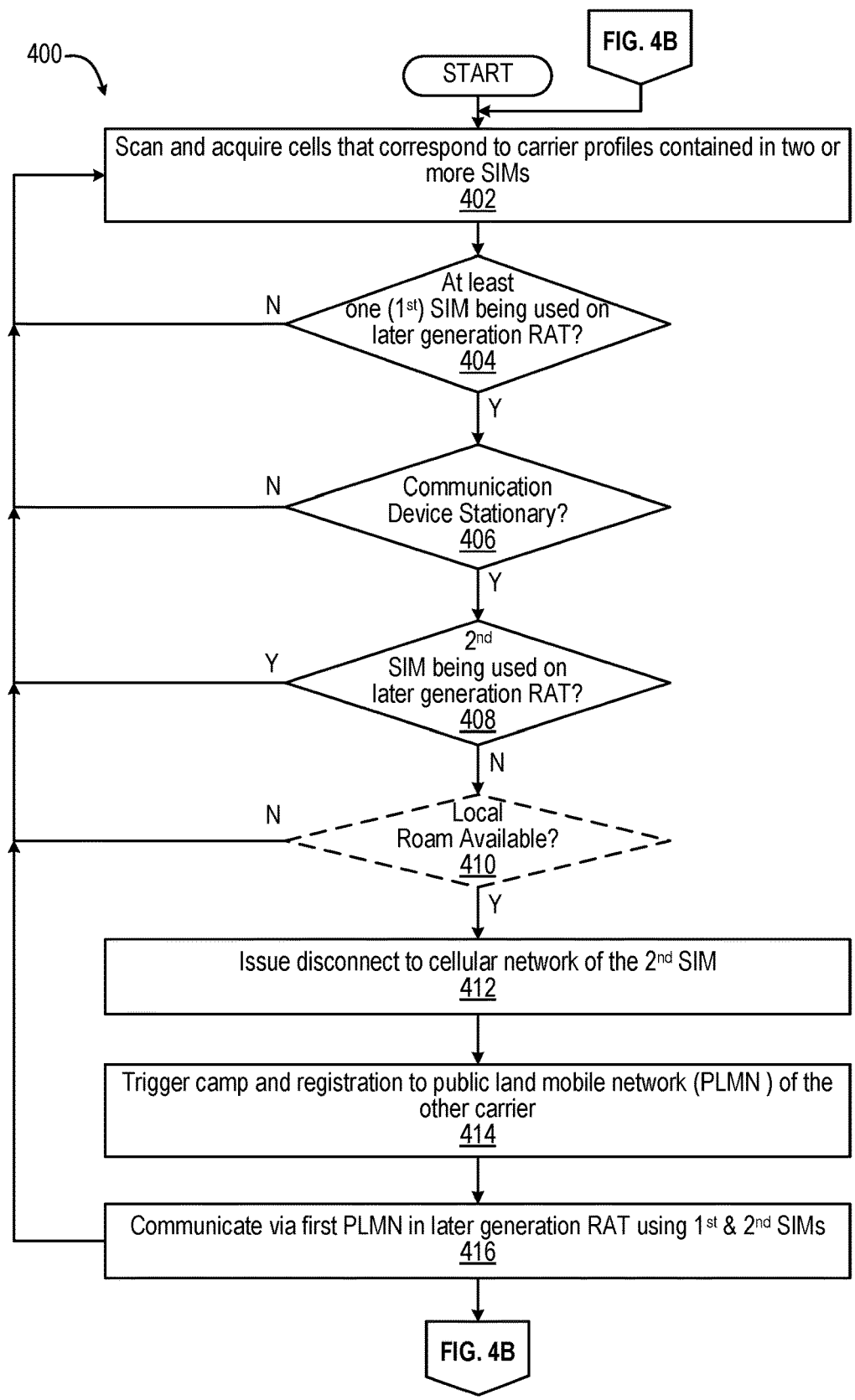
FIGS. 4A-4B (FIG. 4) present a flow diagram of a method for increasing functionality of a dual SIM communication device that is substantially stationary, according to one or more embodiments.
Figure 4B:
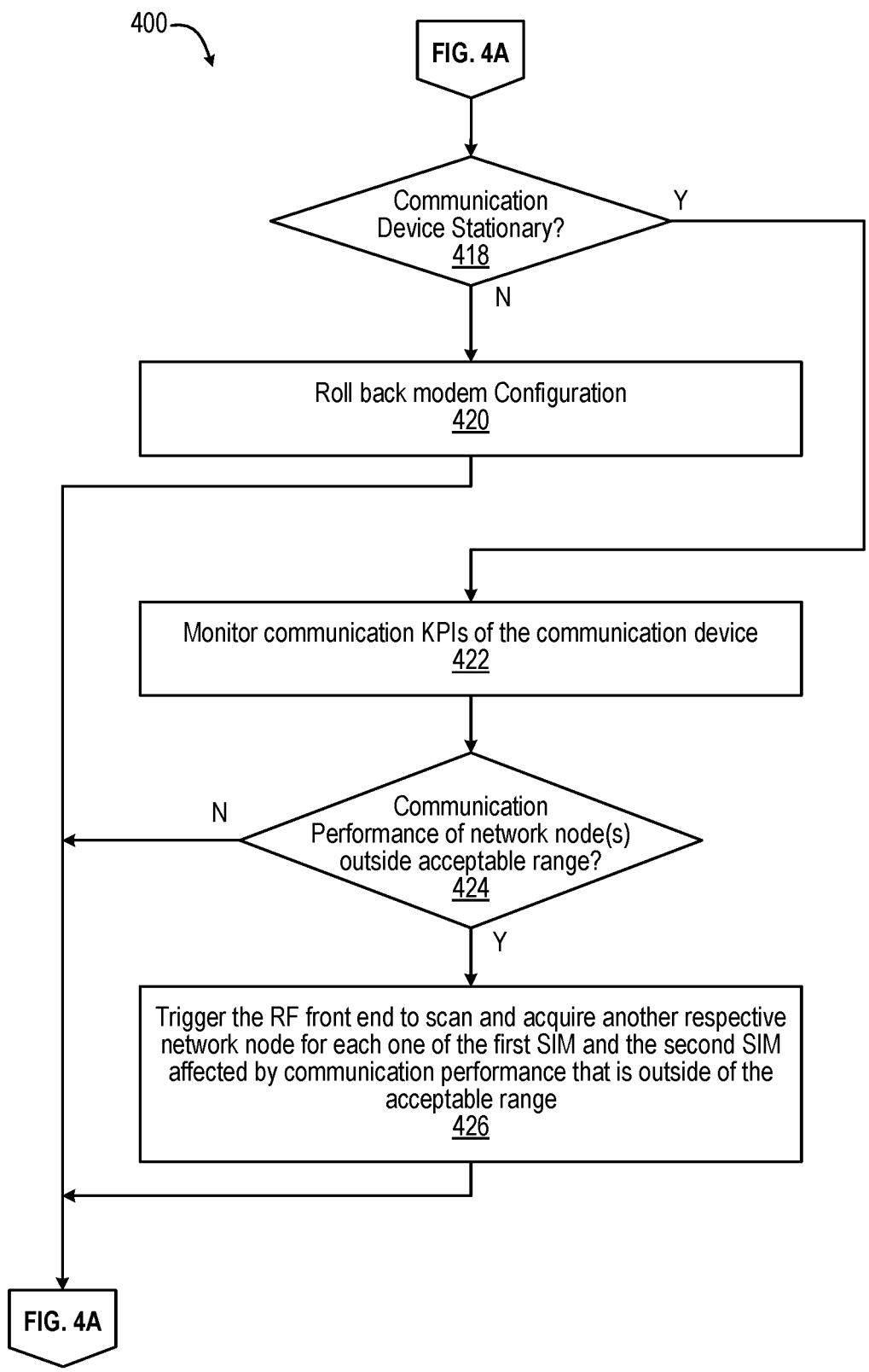

FIGS. 4A-4B (FIG. 4) present a flow diagram of a method for increasing multi-SIM operational functionality of a dual SIM communication device that is substantially stationary. The description of method 400 is provided with general reference to the specific components illustrated within the preceding FIGS. 1-3. In at least one embodiment, communication device 100, managed by controller 101, performs method 400 by dynamically configuring RF front end 124 using SIMS 102a-102b (FIG. 1). Controller 101 executes MCSA application 153 (FIG. 1) to provide the multi-SIM operational functionality of method 400. Specific components described in method 400 can be identical or similar to components of the same name used to describe preceding FIGS. 1-3. For clarity, method 400 presents a simple scenario of two SIMS and two PLMNs. Aspects of the present disclosure can include more than two SIMS and more than two PLMNs. Method 400 includes monitoring for conditions that warrant triggering another RF communication chain that uses a second SIM to camp on a first home communication network of the first SIM. For clarity, the preconditions of method 400 include having a first RF chain of the first SIM on a later generation RAT (e.g., 5G NR), a second RF chain of the second SIM on an older generation of RAT (e.g., 4G LTE), and the communication device being stationary. Aspects of the present disclosure apply to additional combinations of conditions, such as those described below in FIG. 5.

In a stationary state, conventional communication devices do not change the configuration of RF front end 124. First RF chain remains camped on one PLMN as enabled by the first SIM and a second RF chain remains camped on another PLMN as enabled by the second SIM. Conventional communication devices autonomously operate dual RF chains that use respective SIMS. No entity operates on the conventional communication device to recognize an opportunity for additional or improved multi-SIM operational functionality by moving one RF chain to camp on another PLMN. In the scenario presented by FIG. 4, conventional communication devices do not prompt the second RF chains to camp on the first PLMN in order to use the later generation RAT rather than an older generation RAT. The improved multi-SIM operational functionality of increased communication performance and/or additional level of quality of service is provided by using the second SIM to also camp on the home communication network of the first SIM in the later generation RAT. For clarity, method 400 presents at least one aspect of the present disclosure that enables improvement by connecting to a later generation RAT using a SIM as a non-subscriber. In one or more embodiments, the present disclosure includes prompting connection to a later generation RAT and not necessarily the later generation. In one or more embodiments, such as discussed below for FIG. 5, the present disclosure can include connecting to a network node as a non-subscriber to use the same RAT or even an inferior RAT. The determination to prompt the switch is based on obtaining a better signal quality or available data rate to improve communication service. For example, one of the RF chains can be in a marginal coverage area due to distance from network nodes of one PLMN. Marginal coverage relates to communication performance being barely acceptable or subject to occasional loss of a communication connection. For another example, one network node can have too many subscribers connected to support a required level of quality of service. The available communication allocations are divided between the number of connected subscribers, which can result in a subscriber being assigned less data throughput than requested. For an additional example, a particular RF band used by one network node can be subject to interference whereas a network node of another PLMN can use a different RF band that is not subject to the interference.

With reference to FIG. 4A, method 400 includes scanning and acquiring cells that correspond to carrier profiles contained in two or more SIMS (block 402). Method 400 includes determining, in decision block 404, whether at least one of the SIMS, which for clarity is referred to as the first SIM, is being used on a later generation RAT. In response to determining that the first SIM is not being used on the later generation RAT, then method 400 returns to block 402. In response to determining that the first SIM is being used on the later generation RAT, then method 400 includes determining whether the communication device is substantially stationary (decision block 406). In response to determining that the communication device is not stationary, method 400 returns to block 402. In response to determining that the communication device is stationary, method 400 includes determining whether another SIM, which for clarity is referred to as the second SIM provisioned on the communication device, is being used on the later generation RAT (decision block 408). In response to determining that the second SIM is being used on the later RAT, method 400 returns to block 402.

In response to determining that the second SIM is not being used on the latest generation RAT, method 400 includes determining (in decision block 410) whether local roaming is available. For example, a controller of the communication device can access a data structure that indicates which communication networks are accessible to each SIM provisioned on the communication device. As another example, the controller of the communication device can access a user setting that enables roaming to other communication networks. In one or more embodiments, method 400 does not include this checking for an ability to access another communication network. Returning to FIG. 4, in response to determining in decision block 410 that local roaming is not available, method 400 includes returning to block 402. In response to determining that local roaming is available in decision block 410, method 400 includes issuing a disconnect command to the cellular network of the other SIM, referred to herein as a second SIM (block 412). Method 400 includes triggering the communication device to camp and register to a PLMN of the other carrier (block 414). In one or more embodiments, the communication device is triggered by intentionally preventing the communication device from measuring signals of network nodes of a communication network of the second SIM. An RF front end of the communication device responds by scanning and acquiring network nodes of a PLMN that is not a home network of the second SIM. For clarity, two RF chains that respectively use the first and the second SIMS can be camped on the same first PLMN. Method 400 includes communicating via the first PLMN in the later generation RAT using the first and the second SIMS (block 416).

With reference to FIG. 4B, method 400 includes determining, in decision block 418, whether the communication device is stationary. In response to determining that the communication device is not stationary, method 400 includes rolling back the modem configuration to a default configuration (block 420). Then method 400 returns to block 402 (FIG. 4A). In response to determining that the communication device is stationary, method 400 includes monitoring communication KPIs of the communication device (block 422). Particular KPIs are monitored as providing metrics associated with communication performance. The KPIs are monitored to enable closed loop control of network node selection for OTA communication services. Method 400 includes determining, in decision block 424, whether the communication performance of one or more of the respective network nodes is outside of an acceptable range. For example, the acceptable range can be above a threshold. In response to determining that the communication performance of one or more of the respective network nodes is outside of the acceptable range, method 400 includes triggering the RF front end to scan and acquire another respective network node for each one of the first SIM and the second SIM affected by communication performance that is outside of the acceptable range (block 426). Then method 400 returns to block 402 (FIG. 4A).

In one or more embodiments, method 400 includes determining that the RF front end is camped on one of the first subset of network nodes that includes a first cell using a first radio access technology (RAT). Method 400 includes determining that the RF front end is also camped on one of the second subset of network nodes that include a second cell using the second RAT. The second RAT differs from the first RAT in at least one of data throughput and data latency. Method 400 includes triggering the RF front end to scan and acquire one of the first subset of network nodes using the second SIM and using the first RAT. Method 400 includes registering the communication device on the first PLMN using the second SIM and the first RAT.

In one or more embodiments, method 400 includes triggering the RF front end to scan for and acquire the first cell using the second SIM by skipping a measurement scan of a signal strength of a signal received from the second cell. The RF front end is configured to associate not receiving a signal strength measurement with the communication device not being within a coverage area of cells operated by the second carrier and to respond by scanning and acquiring the first cell of the first PLMN using the second SIM.

In one or more embodiments, method 400 includes determining that at least one of the communication performance and the level of quality of service would be improved by communicating via the first PLMN using the second SIM by evaluating at least two signal variables from among quality of service, signal quality, data latency, and data throughput against preset threshold values. According to one aspect, RF front end can be configured via both the first SIM and the second SIM to have two RF chains connected simultaneously to the same network node of the first PLMN.

Figure 5A:
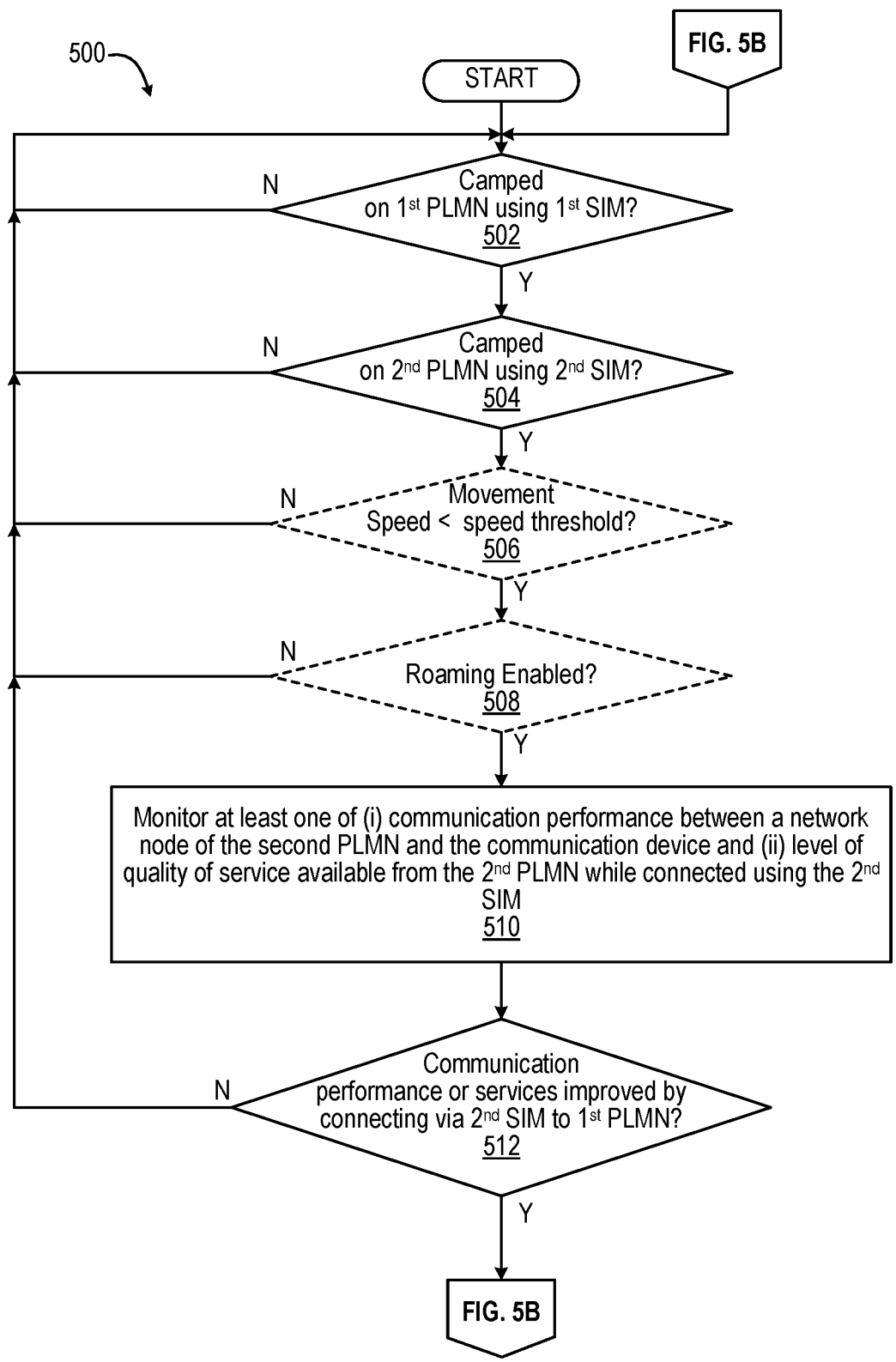
FIGS. 5A-5B (FIG. 5) present a flow diagram of a method for increasing functionality of a multiple SIM communication device located within coverage areas of multiple communication networks, according to one or more embodiments.
Figure 5B:
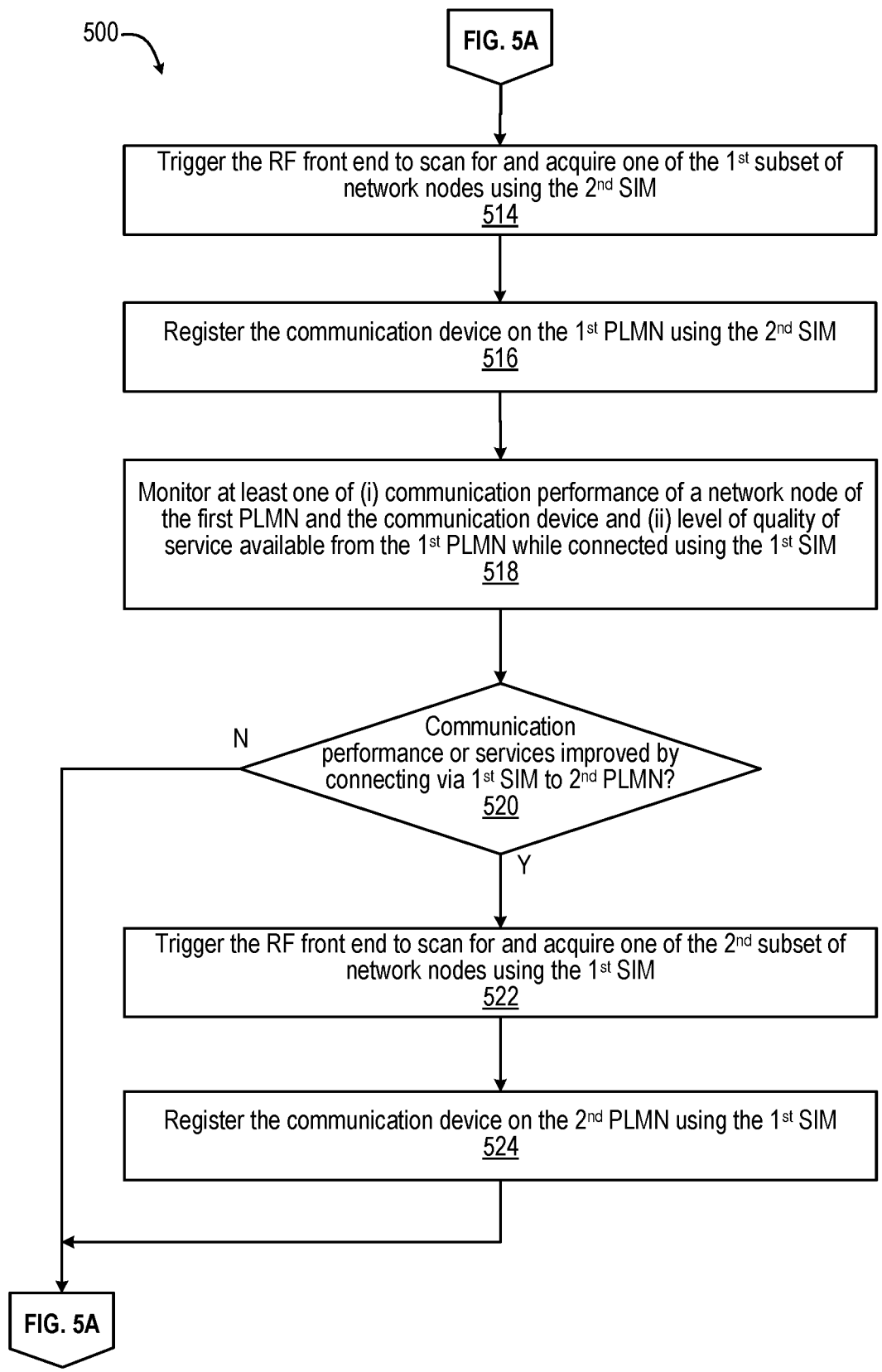

FIGS. 5A-5B (FIG. 5) present a flow diagram of a method for increasing multi-SIM operational functionality of a multiple SIM communication device within coverage areas of multiple communication networks. The description of method 500 is provided with general reference to the specific components illustrated within the preceding FIGS. 1-3. In at least one embodiment, communication device 100, managed by controller 101, performs method 500 by dynamically configuring RF front end 124 using SIMS 102a-102n (FIG. 1). Controller 101 executes MCSA application 153 (FIG. 1) to provide the multi-SIM operational functionality of method 500. Components described in method 500 can be identical or similar to specific components of the same name used to describe preceding FIGS. 1-3. With reference to FIG. 5A, method 500 includes determining, in decision block 502, whether a RF front end of a communication device is camped on a first network node of a first subset of network nodes of a first PLMN using a first SIM. In particular, the first SIM includes credentials that enable the communication device to camp on the first PLMN as a first home PLMN rather than as a guest, visiting, or roaming PLMN. In one or more embodiments, the first subset of network nodes includes one of: (i) a cell of at least one radio access network (RAN); and (ii) an access point of a wireless access network. In response to determining that the RF front end is not camped on the first network node using the first SIM, method 500 returns to block 502. In response to determining that the RF front end is camped on the first network node using the first SIM, method 500 includes determining, in decision block 504, whether the RF front end of the communication device is camped on a second network node of a second subset of network nodes of a second PLMN using a second SIM. In particular, the second SIM includes credentials that enable the communication device to camp on the second PLMN as a home PLMN rather than as a guest, visiting, or roaming PLMN. In response to determining that the RF front end is not camped on the second network node using the second SIM, method 500 returns to block 502. In one or more embodiments, in response to determining that the RF front end is camped on the second network node using the second SIM, method 500 includes determining whether a movement speed of the communication device is less than a speed threshold associated with stable OTA communication with the first cell and the second cell (decision block 506). This state is referred to as "substantially stationary." In one or more embodiments, in response to determining that the movement speed is greater than or equal to the speed threshold, method 500 includes returning to block 502. In response to determining that the movement speed is less than the speed threshold, method 500 includes determining whether setting for communication device include enabling roaming (decision block 508). In response to roaming being disabled, method 500 returns to block 502. In response to roaming being enabled, method 500 includes monitoring at least one of (i) communication performance between a network node of the second PLMN and the communication device and (ii) level of quality of service available from the second PLMN while connected using the second SIM (block 510). Method 500 includes evaluating, in decision block 512, whether at least one of the communication performance and the level of quality of service is improved by connecting via the second SIM to the first PLMN. In response to determining that at least one of the communication performance and the level of quality of service would not be improved by connecting via the second SIM to the first PLMN, method 500 returns to block 502.

In response to determining that at least one of the communication performance and the level of quality of service would be improved by connecting via the second SIM to the first PLMN, in FIG. 5B method 500 includes triggering the RF front end to scan for and acquire one of the first subset of network nodes using the second SIM (block 514). Method 500 includes registering the communication device on the first PLMN using the second SIM (block 516).

In response to determining, in decision block 512, that at least one of the communication performance and the level of quality of service would not be improved by connecting via the second SIM to the first PLMN, method 500 includes monitoring at least one of (i) communication performance between a network node of the first PLMN and the communication device and (ii) level of quality of service available from the first PLMN while connected using the first SIM (block 514). Method 500 includes evaluating, in decision block 516, whether at least one of the communication performance and the level of quality of service is improved by connecting via the first SIM to the second PLMN. In response to determining that at least one of the communication performance and the level of quality of service would be improved by connecting via the first SIM to the second PLMN, method 500 includes triggering the RF front end to scan for and acquire one network node from among the second subset of network nodes using the first SIM (block 518). Method 500 includes registering the communication device on the second PLMN using the first SIM (block 520). Then method 500 returns to block 502. In response to determining that neither the communication performance or the level of quality of service would be improved by connecting via the first SIM to the second PLMN and also after block 520, method 500 returns to block 502.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
a radio frequency (RF) front end that is configurable for over-the-air (OTA) communication;
a first subscriber identity module (SIM) that enables the RF front end to communicate with a first public land mobile network (PLMN) as one home PLMN via one of a first subset of network nodes operated by at least one first carrier;
at least one second SIM, each second SIM enabling the RF front end to communicate via a second PLMN as another home PLMN via one of a second subset of network nodes operated by at least one second carrier;
a memory that stores a multiple carrier scan and acquisition (MCSA) application and one or more applications that use level of quality of service provided by the RF front end; and
a controller communicatively coupled to the RF front end, the first SIM, each of the at least one second SIM, and the memory, the controller executing the MCSA application, which configures the communication device to:
determine that the RF front end is camped on a first network node of the first subset of network nodes using the first SIM and on a second network node of the second subset of network nodes using a second SIM among the at least one second SIM;
monitor at least one of (i) communication performance between the second network node and the communication device and (ii) level of quality of service available from the second PLMN while connected using the second SIM;
evaluate whether at least one of the communication performance and the level of quality of service is improved by connecting via the second SIM to the first PLMN; and
in response to determining that at least one of the communication performance and the level of quality of service would be improved by connecting via the second SIM to the first PLMN:
trigger the RF front end to scan for and acquire one of the first subset of network nodes using the second SIM; and
register the communication device on the first PLMN using the second SIM.

2. The communication device of claim 1, wherein the controller configures the communication device to:
determine that the RF front end is camped on a first network node of the first subset of network nodes using the first SIM and on a second network node of the second subset of network nodes using a second SIM among the at least one second SIM;
monitor at least one of (i) communication performance between the first network node and the communication device and (ii) level of quality of service available from the first PLMN while connected using the first SIM;
evaluate whether at least one or the communication performance and the level of quality of service is improved by connecting via the first SIM to the second PLMN; and
in response to determining that at least one of the communication performance and the level of quality of service would be improved by connecting via the first SIM to the second PLMN:
trigger the RF front end to scan for and acquire one of the second subset of network nodes using the first SIM; and
register the communication device on the second PLMN using the first SIM.

3. The communication device of claim 1, wherein a particular network node of one of the first and the second subsets of network nodes comprises one of: (i) a cell of at least one radio access network (RAN); and (ii) an access point of a wireless access network.

4. The communication device of claim 3, wherein:
the RF front end is configurable to communicate using a first radio access technology (RAT) and at least one second RAT that differs from the first RAT in at least one of data throughput and data latency; and
the controller configures the communication device to:
determine that the RF front end is camped on one of the first subset of network nodes comprising a first cell using the first RAT and on one of the second subset of network nodes comprising a second cell using the second RAT;
trigger the RF front end to scan and acquire one of the first subset of network nodes using the second SIM and using the first RAT; and
register the communication device on the first PLMN using the second SIM and the first RAT.

5. The communication device of claim 3, wherein the controller triggers the RF front end to scan for and acquire the first cell using the second SIM by skipping a measurement scan of a signal strength of a signal received from the second cell, the RF front end configured to associate not receiving a signal strength measurement with the communication device not being within a coverage area of cells operated by the second carrier and to respond by scanning and acquiring the first cell of the first PLMN using the second SIM.

6. The communication device of claim 1, wherein:
the memory contains a setting variable having a value indicating whether roaming is enabled on a cell of the first PLMN using the second SIM; and
the controller configures the communication device to trigger the RF front end to scan for and acquire the first cell using the second SIM in response to determining that roaming is enabled by the value of the setting variable.

7. The communication device of claim 1, wherein to determine that at least one of the communication performance and the level of quality of service would be improved by communicating via the first PLMN using the second SIM, the communication device evaluates at least two signal variables from among quality of service, signal quality, data latency, and data throughput against preset threshold values.

8. The communication device of claim 1, further comprising a location service comprising at least one of: (i) a receiver configured to determine geospatial location based on a global navigation satellite system; (ii) a motion detection system; and (iii) a RF triangulation system, wherein the controller configures the communication device to:
determine whether the location service indicates movement speed of the communication device that is less than a speed threshold associated with stable OTA communication with the first cell and the second cell;
trigger the RF front end to scan and acquire one of the first subset of network nodes using the second SIM further in response to determining that the movement speed is less than the speed threshold; and
trigger the RF front end to scan for and acquire one of the second subset of network nodes using the second SIM in response to determining that the movement speed is greater than or equal to the speed threshold.

9. The communication device of claim 8, wherein, further in response to determining that the movement speed is less than the speed threshold, the controller configures the communication device to:
monitor respective communication performances by respective network nodes of the first PLMN that the RF front end is camped on via the first SIM and the second SIM; and
in response to determining that the communication performance of one or more of the respective network nodes is outside of an acceptable range, trigger the RF front end to scan and acquire another respective network node for each one of the first SIM and the second SIM affected by communication performance that is outside of the acceptable range.

10. The communication device of claim 1, wherein at least one of the first and the second SIM cards is an embedded SIM card.

11. A method comprising:
determining that a radio frequency (RF) front end of a communication device is camped on a first network node of a first subset of network nodes of a first public land mobile network (PLMN) as one home PLMN using a first subscriber identity module (SIM);
determining that the RF front end of the communication device is camped on a second network node of a second subset of network nodes of a second PLMN as another home PLMN using a second SIM among at least one second SIM;
monitoring at least one of (i) communication performance between the second network node and the communication device and (11) level of quality of service available from the second PLMN while connected using the second SIM;
evaluating whether at least one of the communication performance and the level of quality of service is improved by connecting via the second SIM to the first PLMN; and
in response to determining that at least one of the communication performance and the level of quality of service would be improved by connecting via the second SIM to the first PLMN:
triggering the RF front end to scan for and acquire one of the first subset of network nodes using the second SIM; and
registering the communication device on the first PLMN using the second SIM.

12. The method of claim 11, further comprising:
determining that the RF front end is camped on a first network node of the first subset of network nodes using the first SIM and on a second network node of the second subset of network nodes using a second SIM among the at least one second SIM;
monitoring at least one of (i) communication performance between the first network node and the communication device and (ii) level of quality of service available from the first PLMN while connected using the first SIM;
evaluating whether at least one or the communication performance and the level of quality of service is improved by connecting via the first SIM to the second PLMN; and
in response to determining that at least one of the communication performance and the level of quality of service would be improved by connecting via the first SIM to the second PLMN:
triggering the RF front end to scan for and acquire one of the second subset of network nodes using the first SIM; and
registering the communication device on the second PLMN using the first SIM.

13. The method of claim 11, further comprising registering the communication device on a particular network node of one of the first and the second subsets of network nodes that comprises one of: (i) a cell of at least one radio access network (RAN); and (ii) an access point of a wireless access network.

14. The method of claim 13, wherein:
determining that the RF front end is camped on one of the first subset of network nodes comprising a first cell using a first radio access technology (RAT) and on one of the second subset of network nodes comprising a second cell using the second RAT that differs from the first RAT in at least one of data throughput and data latency;
triggering the RF front end to scan and acquire one of the first subset of network nodes using the second SIM and using the first RAT; and
registering the communication device on the first PLMN using the second SIM and the first RAT.

15. The method of claim 13, wherein triggering the RF front end to scan for and acquire the first cell using the second SIM comprises skipping a measurement scan of a signal strength of a signal received from the second cell, the RF front end configured to associate not receiving a signal strength measurement with the communication device not being within a coverage area of cells operated by the second carrier and to respond by scanning and acquiring the first cell of the first PLMN using the second SIM.

16. The method of claim 11, further comprising triggering the RF front end to scan for and acquire the first cell using the second SIM further in response to determining that roaming is enabled by the value of the setting variable.

17. The method of claim 11, wherein determining that at least one of the communication performance and the level of quality of service would be improved by communicating via the first PLMN using the second SIM comprises evaluating at least two signal variables from among level of quality of service, signal quality, data latency, and data throughput against preset threshold values.

18. The method of claim 11, further comprising:
determining whether a movement speed of the communication device that is less than a speed threshold associated with stable OTA communication with the first cell and the second cell;

triggering the RF front end to scan for and acquire one of the second subset of network nodes using the second SIM in response to determining that the movement speed is greater than or equal to the speed threshold;

in response to determining that the movement speed is less than the speed threshold:
  triggering the RF front end to scan and acquire one of the first subset of network nodes using the second SIM further; and
  monitoring respective communication performances by respective network nodes of the first PLMN that the RF front end is camped on via the first SIM and the second SIM; and
  in response to determining that the communication performance of one or more of the respective network nodes is outside of an acceptable range, triggering the RF front end to scan and acquire another respective network node for each one of the first SIM and the second SIM affected by communication performance that is outside of the acceptable range.

19. A computer program product comprising:
a computer readable storage device; and
program code on the computer readable storage device that when executed by a processor associated with a device, the program code enables the communication device to provide the functionality of:
  determining that a radio frequency (RF) front end of a communication device is camped on a first network node of a first subset of network nodes of a first public land mobile network (PLMN) as one home PLMN using a first subscriber identity module (SIM),
  determining that the RF front end of the communication device is camped on a second network node of a second subset of network nodes of a second PLMN as another home PLMN using a second SIM among at least one second SIM;
  monitoring at least one of (1) communication performance between the second network node and the communication device and (i1) level of quality of service available from the second PLMN while connected using the second SIM;
  evaluating whether at least one of the communication performance and the level of quality of service is improved by connecting via the second SIM to the first PLMN; and
  in response to determining that at least one of the communication performance and the level of quality of service would be improved by connecting via the second SIM to the first PLMN:
    triggering the RF front end to scan for and acquire one of the first subset of network nodes using the second SIM; and
    registering the communication device on the first PLMN using the second SIM.

20. The computer program product of claim 19, wherein the program code enables the communication device to provide the functionality of:
  registering the communication device on a particular network node of one of the first and the second subsets of network nodes that comprises one of: (i) a cell of at least one radio access network (RAN); and (ii) an access point of a wireless access network;
  determining that the RF front end is camped on one of the first subset of network nodes comprising a first cell using a first radio access technology (RAT) and on one of the second subset of network nodes comprising a second cell using the second RAT that differs from the first RAT in at least one of data throughput and data latency;
  triggering the RF front end to scan and acquire one of the first subset of network nodes using the second SIM and using the first RAT; and
  registering the communication device on the first PLMN using the second SIM and the first RAT.

* * * * *